(12) United States Patent
Egawa et al.

(10) Patent No.: US 7,540,559 B2
(45) Date of Patent: Jun. 2, 2009

(54) REAR STRUCTURE OF VEHICLE BODY

(75) Inventors: Yasuhisa Egawa, Sakura (JP); Shigeto Yasuhara, Shioya-gun (JP); Yuji Matsuura, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/107,429

(22) Filed: Apr. 22, 2008

(65) Prior Publication Data

US 2008/0277968 A1    Nov. 13, 2008

(30) Foreign Application Priority Data

May 8, 2007    (JP) ............................... 2007-123385

(51) Int. Cl.
*B62D 25/08* (2006.01)
(52) U.S. Cl. ..................... 296/203.04; 29/37.2; 29/204; 29/187.11
(58) Field of Classification Search ................ 296/37.2, 296/37.3, 187.11, 193.04, 203.04, 204
See application file for complete search history.

(56) References Cited

U.S. PATENT DOCUMENTS 5,419,609 A    5/1995    Kmiec et al.
6,672,639 B2 *  1/2004   Kosuge et al. ............. 296/37.2
7,469,959 B2 * 12/2008   Egawa et al. ........... 296/203.04

FOREIGN PATENT DOCUMENTS

EP    1 749 731    2/2007
EP    1 808 362    7/2007

\* cited by examiner

*Primary Examiner*—Dennis H Pedder
*Assistant Examiner*—Pinel E Romain
(74) *Attorney, Agent, or Firm*—Rankin, Hill & Clark LLP

(57) ABSTRACT

A rear structure of a vehicle body including: an arc-shaped frame which is fixed at a middle portion along an extending direction thereof to a rear panel, and has first reinforcing portions in which both ends along the extending direction, which extend along a longitudinal direction of the vehicle body, and which have cross sections opening toward corresponding rear frames; and a pair of rear frames fixed at a rear end thereof to the rear panel, fixed at a front end thereof to corresponding side sill, and has a second reinforcing portion which extends along the longitudinal direction and which has a cross section opening toward the corresponding first reinforcing portion, wherein the first reinforcing portions and the corresponding second reinforcing portions are fixed to each other interposing side flanges of a spare tire pan therebetween.

4 Claims, 7 Drawing Sheets

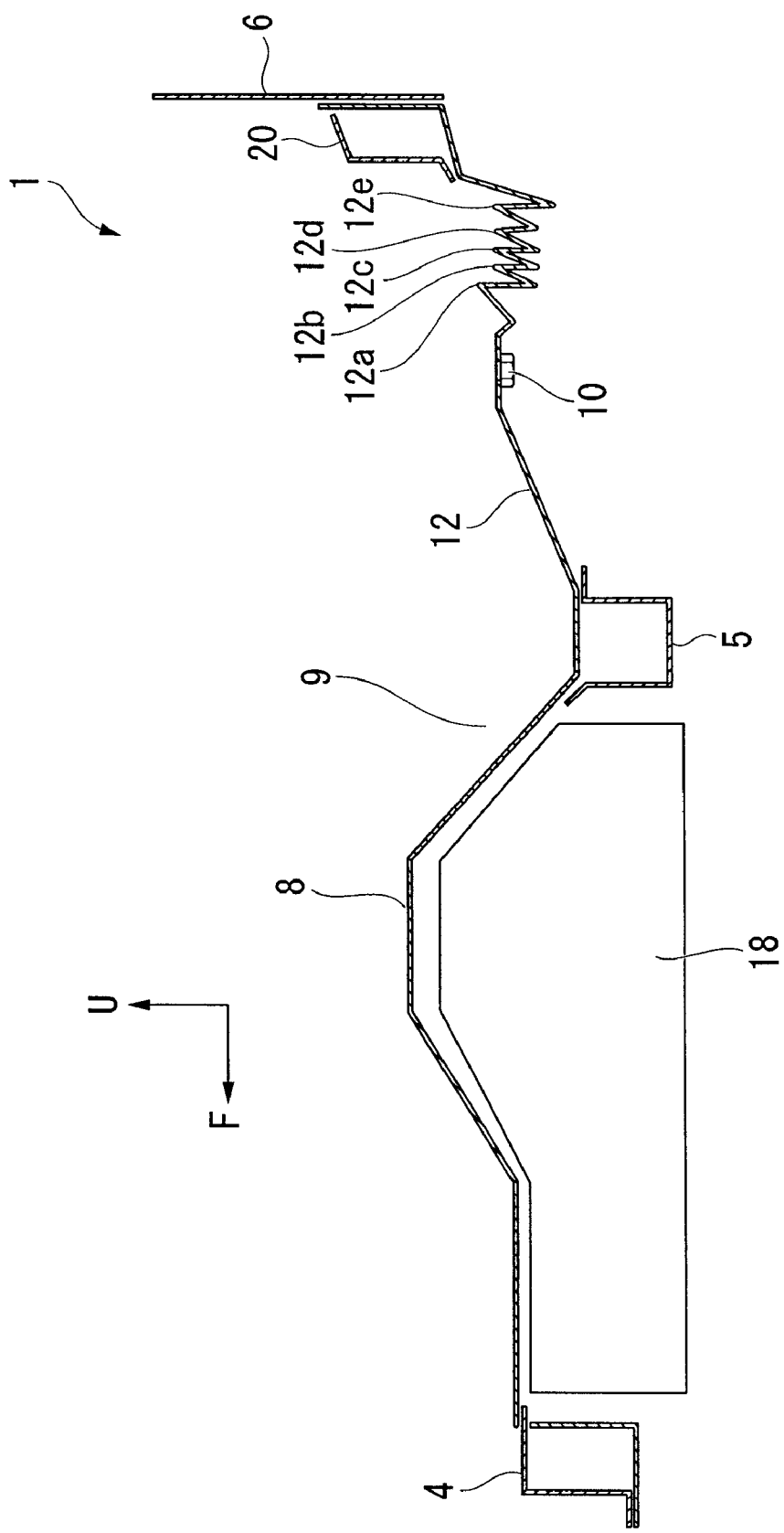

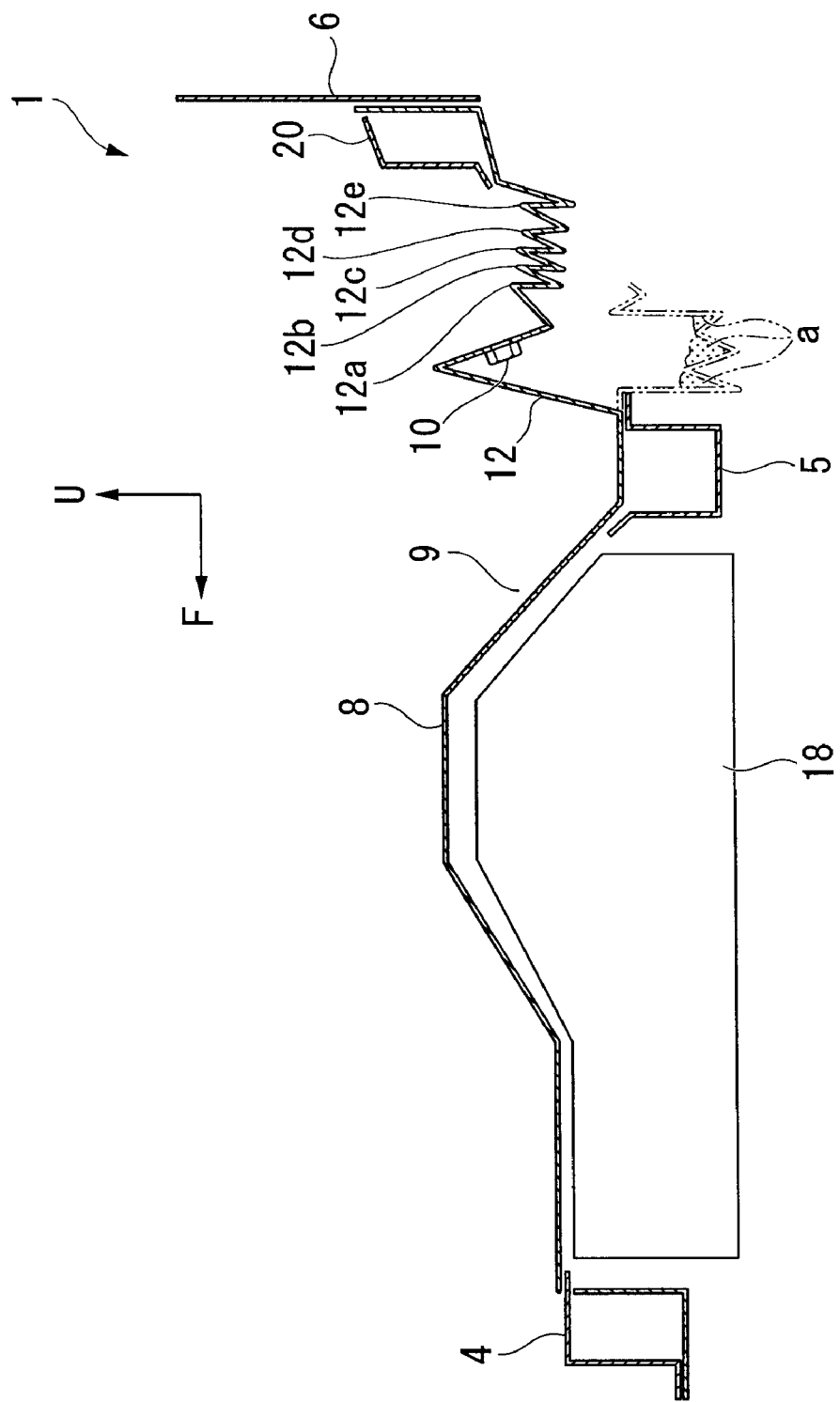

REAR STRUCTURE OF VEHICLE BODY

TECHNICAL FIELD

The present invention relates to a rear structure of a vehicle body of which the weight of the vehicle at the rear can be reduced.

Priority is claimed on Japanese Patent Application No. 2007-123385, filed on May 8, 2007, the contents of which are incorporated herein by reference.

BACKGROUND ART

A pair of rear frames which extends substantially in the longitudinal direction of a vehicle body is provided at the left and right sides of the rear portion of a vehicle. The rear frames are fixed to a rear panel which forms a rear wall of the vehicle body at the rear end thereof, and are fixed to side sills which are provided on both sides of the vehicle body at the front end thereof. The rear frames transmit the collision load to the left and right side sills and absorb the collision energy by collapsing along substantially the longitudinal direction thereof during the rear-end collision. The rear frames are fixed to each other using a cross member at the front ends and substantially the middle positions thereof. Furthermore, the rear frames are fixed to a spare tire pan where a spare tire is stored (for example, refer to Japanese Unexamined Patent Application, First Publication No. 2004-338419).

SUMMARY OF THE INVENTION

Problems to be Solved

The left and right rear frames extend substantially linearly along the longitudinal direction of the vehicle body in the conventional rear structure of the vehicle body. Therefore, in a case of a rear-end offset collision in which an input point of load is deviated from the center area in a vehicle width direction, the ratio of the load which is born at the rear frames may be different between the collided side and the uncollided side (for example, 70% at the collided side and 30% at the uncollided side).

In the conventional rear end structure of the vehicle body, it is considered that the load is applied largely to the rear frame of the collided side during the rear-end offset collision. Therefore, it is necessary to reinforce the rear frames in order to support the large load: as a result, it is for the frame weight in the rear end of the vehicle body is increased.

Means to Solve the Problem

An object of the present invention is to provide a rear structure of a vehicle body in which the weight of a frame in the rear vehicle body can be reduced by enabling collision load during a rear-end offset collision to be supportedly dispersed at the rear end of the vehicle efficiently.

In order to solve the above problem, the present invention is a rear structure of a vehicle body including: a left-and-right pair of rear frames which extend along a longitudinal direction of a vehicle body; a spare tire pan which is supported between the rear frames; an arc-shaped frame which forms an arc-shape opening forward of the vehicle body as seen in a plan view; a rear panel which forms a rear wall of the vehicle body; and a pair of side sills which is provided on both sides of the vehicle, wherein: the arc-shaped frame is fixed at a middle portion along an extending direction thereof to the rear panel, and has first reinforcing portions in which both ends along the extending direction, which extend along the longitudinal direction, and which have cross sections opening toward the corresponding rear frames; each of the rear frames is fixed at a rear end thereof to the rear panel, is fixed at a front end thereof to the corresponding side sill, and has a second reinforcing portion which extends along the longitudinal direction and which has a cross section opening toward the corresponding first reinforcing portion; and the first reinforcing portions and the corresponding second reinforcing portions are fixed to each other interposing side flanges of the spare tire pan therebetween.

According to the present invention, when collision load is input to the rear panel via a bumper and the like during a rear-end offset collision, the collision load is input mainly to the rear end of the first frame at the collided rear frame and the top portion of the arc-shaped frame. The load input to the top portion of the arc-shaped frame is input substantially equally to the left-and-right rear frames via both ends of the arc-shaped frame. The collision load can be transmitted efficiently to the spare tire pan since the arc-shaped frame and the first frames are fixed to each other with interposing the flanges of the spare tire pan.

According to the present invention, a load transmission path from the rear frames to the side sills and the other load transmission path from the top of the arc-shaped frame to both the rear frames and the side sills via both ends of the arc-shaped frame are provided. Therefore, without increasing the thickness of the rear frames, the collision load can be dispersed in the rear of the vehicle body. As a result, the weight of the vehicle frame can be reduced.

Further, in the present invention, flanges of the arc-shaped frame and the rear frames are fixed to each other interposing the side flanges of the spare tire pan, so that a closed cross section structure is formed. Therefore, the spare tire pan can be efficiently utilized to absorb the collision load since the collision load is transmitted to the spare tire pan. In addition, the flanges of the arc-shaped frame and the rear frames are fixed interposing the spare tire pan. Accordingly, the rigidity of the load transmission paths between the arc-shaped frame and the rear frames can be improved certainly.

In the present invention, it is preferable that each of the rear frames include: a first frame which is fixed to the rear panel; and a second frame which is fixed to the side sill and the front end of the first frame, and which has a rigidity higher than the rigidity of the first frame.

In this case, damage to a front portion of the vehicle body can be prevented since the first frame is deformed before the second frame.

In the present invention, it is preferable that the rear structure of a vehicle body further include a plurality of arc-shaped beads protruding upward and forming concentric arc shapes.

In this case, the collision load of the rear-end collision can be absorbed by deformation of the arc-shaped beads since the arc-shaped beads are easier to be deformed than the other portions in the spare tire pan.

In the present invention, it is preferable that the rear structure of a vehicle body further have linear beads extending from both ends of the arc-shaped beads and protruding upward, wherein the arc-shaped beads and the linear beads form U-shape beads opening forward of the vehicle body.

In this case, the linear beads are provided at the front of the arc-shaped beads extending in the width direction of the vehicle body. The arc-shaped beads are easier to be deformed than the linear beads having high rigidity along the longitudinal direction of the vehicle body in the rear-end collision. Accordingly, the collision load can be absorbed in the arc-shaped beads at the rear of the vehicle body, so that the deformation at the rear of the vehicle body can be prevented.

BRIEF DESCRIPTION OF THE DRAWINGS

FIG. 6 is a cross sectional view taken along the B-B line of FIG. 1 at a middle stage of a rear-end collision.

FIG. 7 is a cross sectional view taken along the B-B line of FIG. 1 at a latter stage of a rear-end collision.

DETAILED DESCRIPTION OF THE INVENTION

Figure 1:
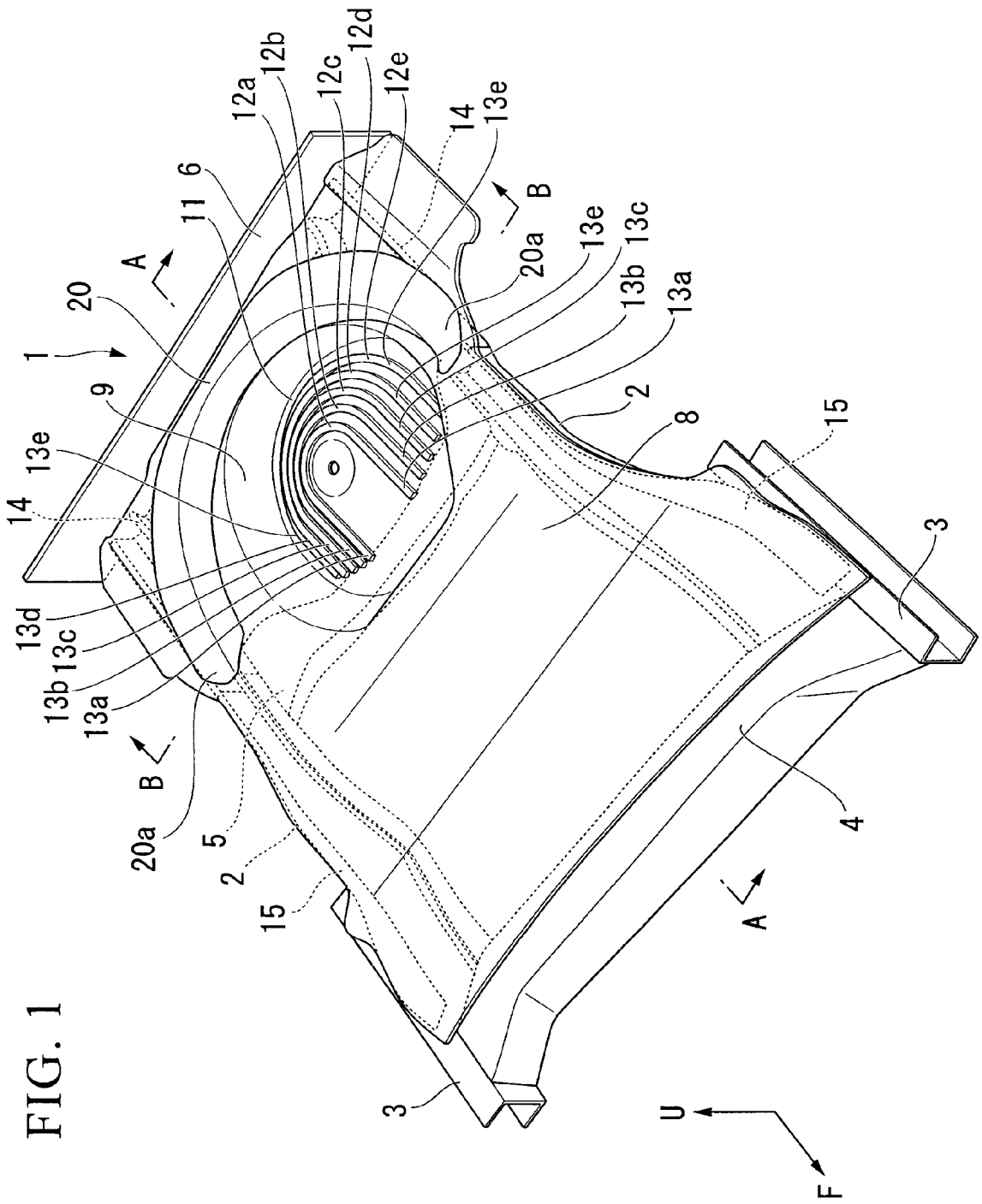
FIG. 1 is a perspective view showing the rear structure of a vehicle body as seen diagonally from the top front in an embodiment of the present invention.

An embodiment of the present invention will be explained below referring to drawings. Hereinafter, the words "front", "rear", "top", and "bottom" in the following description denote "front", "rear", "top", and "bottom" of a vehicle body if there is no explanation. An arrow F in the drawings denotes the front of the vehicle; and an arrow U denotes the top of the vehicle.

Figure 2:
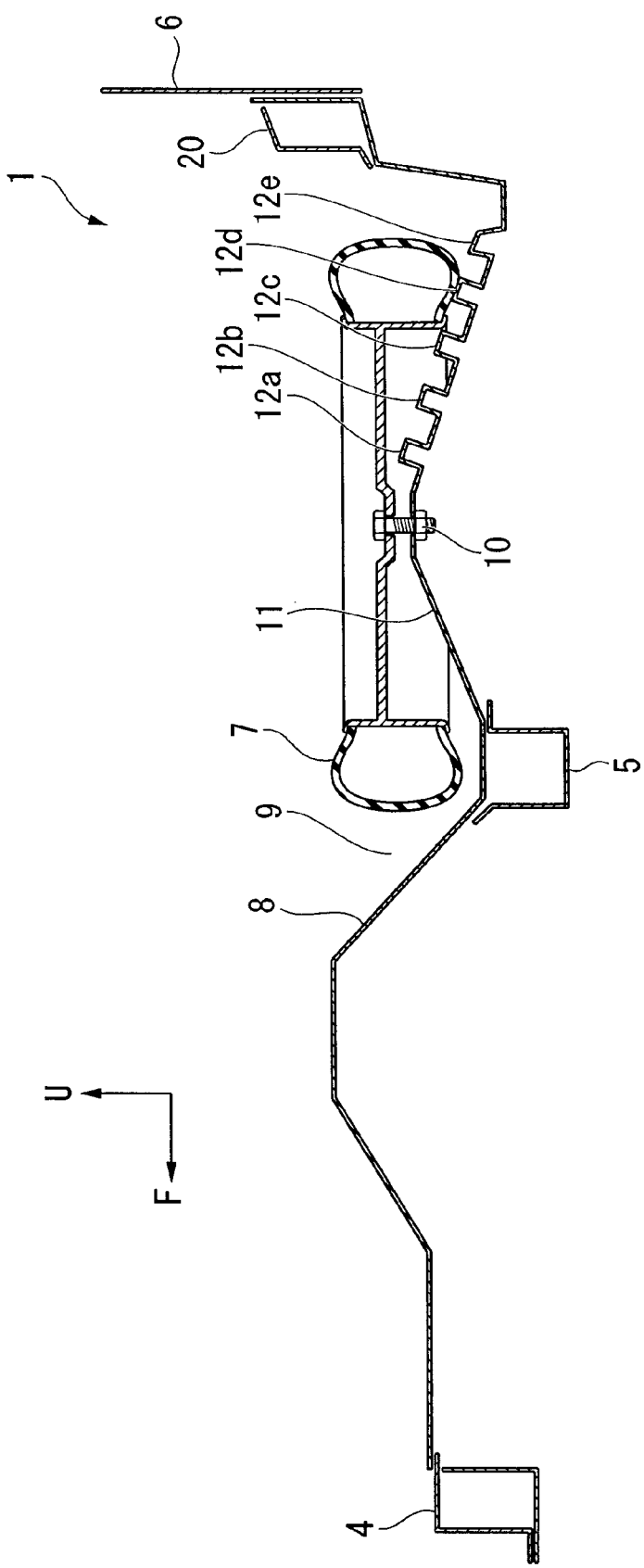
FIG. 2 is a cross sectional view taken along the A-A line of FIG. 1.
Figure 3:
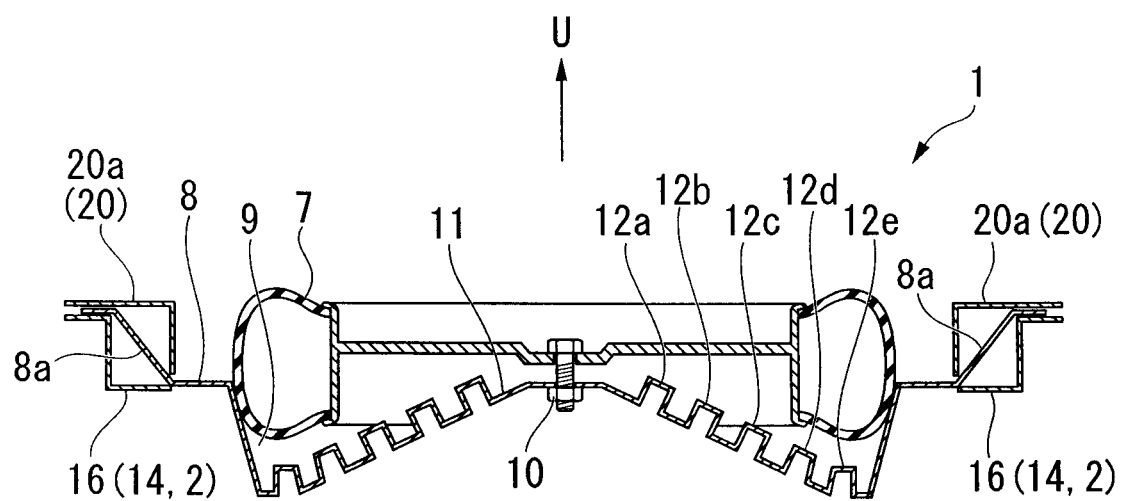
FIG. 3 is a cross sectional view taken along the B-B line of FIG. 1.
Figure 4:
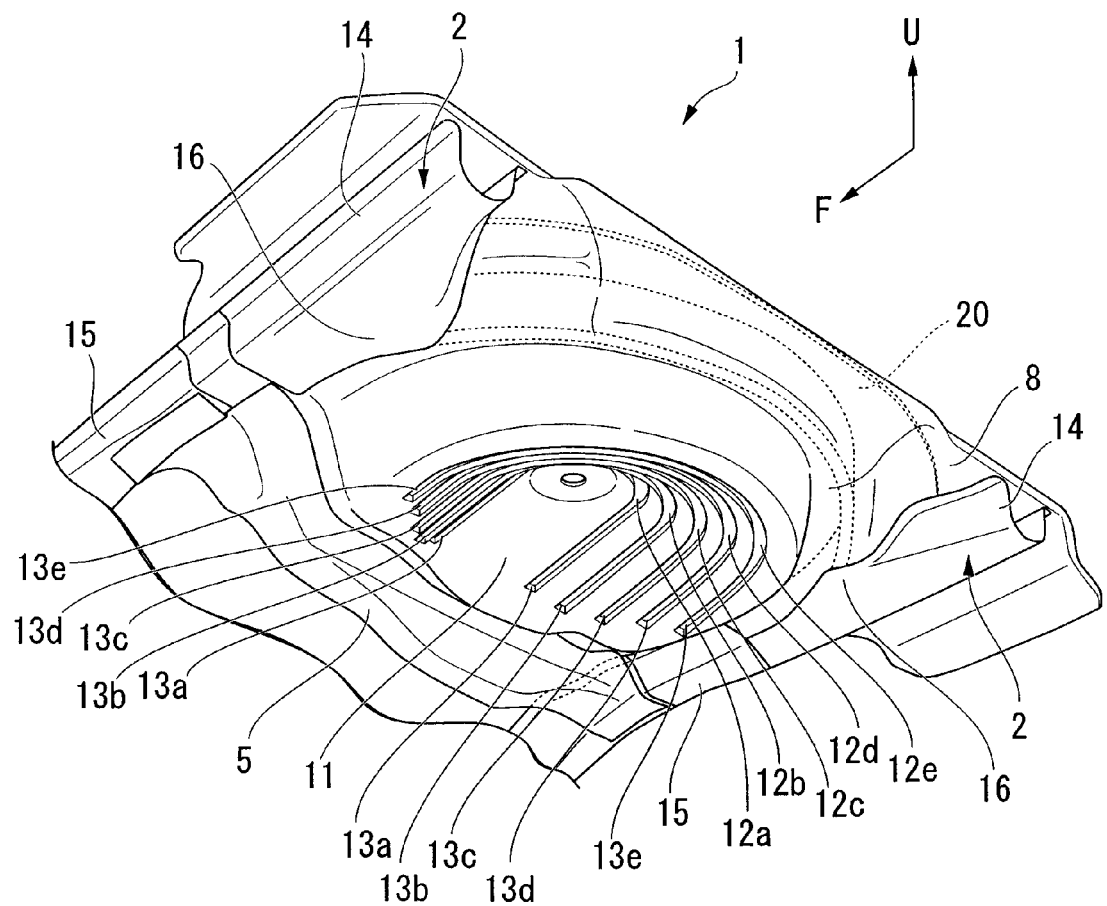
FIG. 4 is a perspective view showing the rear structure of a vehicle body as seen diagonally from the bottom rear in the embodiment.

FIG. 1 is a perspective view showing a vehicle 1 having a rear structure of a vehicle of the present invention. FIG. 2 is a cross sectional view taken along the A-A line of FIG. 1 showing the vehicle 1. FIG. 3 is a perspective view taken along the B-B line of FIG. 1. FIG. 4 is a perspective view of the vehicle 1 diagonally from the bottom rear.

The vehicle 1 has a left-and-right pair of rear frames 2 which are arranged substantially along a longitudinal direction of a vehicle body on the bottom face of the rear of the vehicle body. Front ends of the rear frames 2 are fixed to side sills provided on left-and-right of the vehicle body and to a middle cross member 4 connecting rear ends of the side sills 3. The rear frames 2 are provided with a rear cross member 5 at a middle portion thereof. The rear end of the rear frames 2 are fixed to a rear panel 6 forming a rear wall of the vehicle body. A bumper beam of a rear bumper (not shown) is arranged outside the rear panel 6. A spare tire pan 8 which supports a spare tire 7 (refer to FIGS. 2, 3) below a trunk is fixed to upper faces of the rear frames 2 and the rear cross member 5.

The spare tire pan 8 includes a tire storing portion 9 which is depressed downward substantially in a circular shape from substantially the center of the spare tire pan 8. The spare tire 7 is stored in the tire storing portion 9 (refer to FIGS. 2, 3). A spare tire anchor nut 10 for fixing the spare tire 7 by a bolt is installed in a bottom wall of the tire storing portion 9 at the vicinity of the center portion of the bottom wall. A substantially conical portion 11 in which the center thereof protrudes upward so that the vicinity of the spare tire anchor nut 10 is at the top of the conical shape is provided on the bottom wall of the tire storing portion 9.

Arc-shaped beads, specifically, five arc-shaped beads 12a to 12e which project upward are formed at substantially regular intervals on the substantially conical portion 11 of the spare tire pan 8. The arc-shaped beads 12a to 12e are formed so as to have concentric arcs centered in the vicinity of the spare tire anchor nut 10, and so that tops of the arcs face backward of the vehicle body (that is, so as to open forward of the vehicle body). Accordingly, as shown in FIG. 2, the arc-shaped beads 12a to 12e form a wavy pattern in a section along the longitudinal direction of the vehicle body at a rear region of the substantially conical portion 11.

Linear beads 13a to 13e are formed in the spare tire pan along the longitudinal direction of the vehicle body so as to extend from both ends of the arc-shaped beads 12a to 12e to the vicinity of the rear cross member 5. The linear beads 13a to 13e protrude upward from the spare tire pan 8 as the arc-shaped beads 12a to 12e. The linear beads 13a to 13e have cross sections continuous to cross sections of the arc-shaped beads 12a to 12e. The arc-shaped beads 12a to 12e and the linear beads 13a to 13e form U-shape beads opening forward of the vehicle body.

The left-and-right rear frames 2 which support the spare tire pan 8 are formed of first frames 14 at the rear side of the vehicle body and second frames 15 at the front side of the vehicle body. The first frames 14 are fixed to the rear panel 6 at rear ends thereof. The second frames 15 are fixed to the side sills 3 at front ends thereof and to the front ends of the first frame 14 at rear ends thereof. The first frames 14 and the second frames 15 have a hat-shaped cross section opening upward taken along a vehicle width direction; that is, in the first frames 14 and the second frames 15, flanges are formed on both edges of a U-shape section opening upward. However, in a front portion of the first frame 14, as shown in FIG. 3, a side wall facing the tire storing portion 9 of the spare tire pan 8 is gradually inclined inside of the vehicle width direction, so that substantially an L-shape second reinforcing portion is formed.

An arc-shaped frame 20 having substantially an arc shape as seen in the plan view connects a center portion of the rear panel 6 in the vehicle width direction with front regions of the first frames 14. The arc-shaped frame 20, as shown in FIGS. 2 and 3, has substantially an L-shape cross section orthogonal to an extending direction thereof, and is stacked and fixed to a rear flange of the spare tire pan 8 and the rear panel 6 at a top portion of the arc-shape thereof. Both ends (i.e., first reinforcing portions 20a) of the arc-shaped frame 20 extend to the vicinity of rear ends of the left-and-right second frames 15. As shown in FIG. 2, the top portion of the arc-shape of the arc-shaped frame 20 (that is, a middle portion in the extending direction) forms a closed boxed section together with the rear flange of the spare tire pan 8.

As described above, the spare tire pan 8 is fixed to the upper face of the left-and-right rear frames 2. Side flanges 8 of the first frames 14 at contacting portions with the second reinforcing portions 16 are inclined obliquely upward toward the side of the vehicle body along the upper shape of the second reinforcing portions 16 as shown in FIG. 3. The side flanges 8a of the spare tire pan 8 are interposed between the first reinforcing portion 20a and the second reinforcing portion 16; and the arc-shaped frame 20 and the first frame 14 are fixed to each other, so that a closed box-shape section is formed. The side flanges 8a reinforce the arc-shaped frame 20 and the first frames 14 by connecting opposite corners of the box. Further, the spare tire pan 8 is firmly supported at the side flanges 8a by the arc-shaped frame 20 and the first frame 14.

Figure 5:
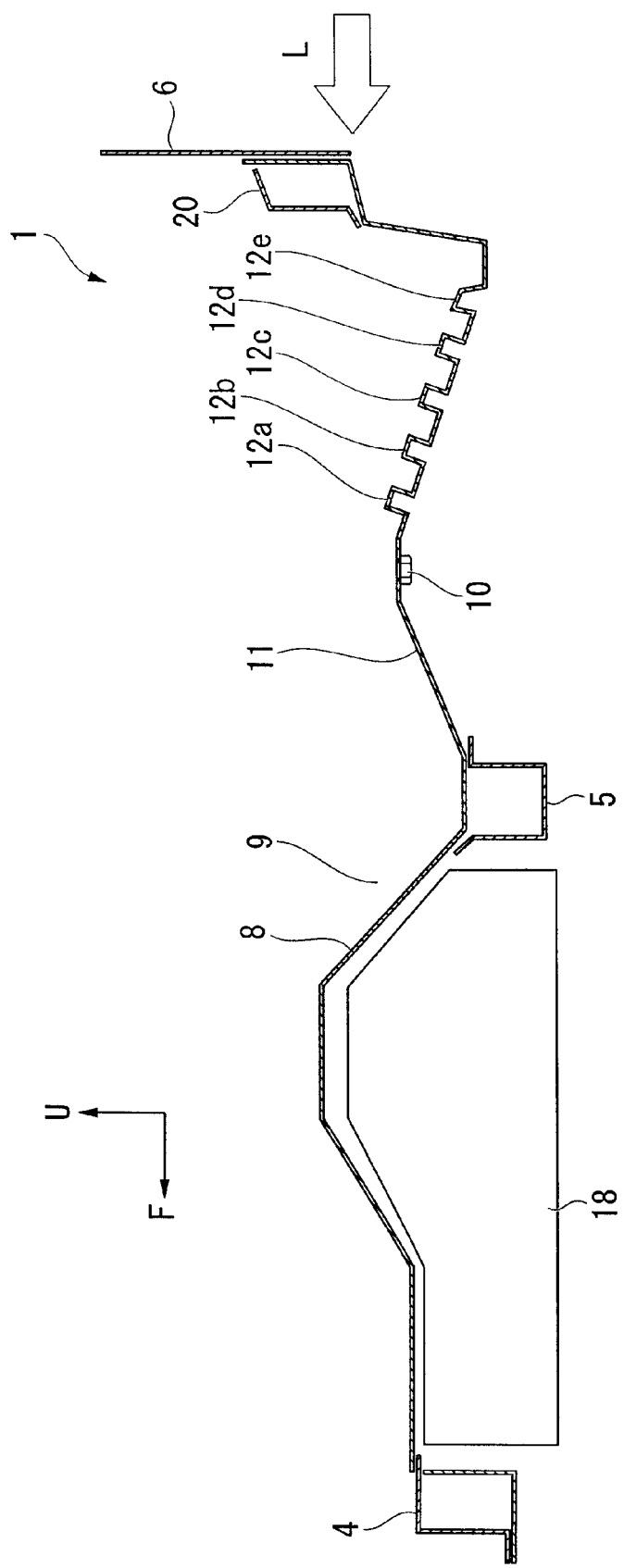
FIG. 5 is a cross sectional view taken along the B-B line of FIG. 1 at an early stage of a rear-end collision.

FIGS. 5 to 7 show successive deformations of the spare tire pan 8 during a rear-end collision of the vehicle 1. The reference number 18 in the drawings denotes a fuel tank arranged below the front of the spare tire pan 8 between the rear cross member 5 and the middle cross member 4.

FIG. 5 shows the state before the spare tire pan 8 deforms. When rear-end collision load L is input to the rear panel 6, the rear-end collision load L is input directly to rear ends of the left-and-right rear frames 2 and transmitted to the side sills 3 (i.e., first load transmission paths); in addition, the rear-end collision load L is transmitted to the side sills 3 via second load transmission paths which go to both ends from the top portion of the arc-shaped frame 20. As a result, the left-and-right rear frames 2 begin to collapse in the longitudinal direction, and the arc-shaped beads 12a to 12e on the spare tire pan 8 are deformed with collapses at the top portions of the arc as shown in FIG. 6.

In this state, since both ends of the arc-shaped beads 12a to 12e are rigidly fixed to the rear cross member 5 via the linear beads 13a to 13e, the collision load L is not scattered over the broad region on the spare tire pan 8 and focused on the vicinity of the top portions of the arc (i.e., the middle portion in the extending direction) of the arc-shaped beads 12a to 12e. Therefore, the spare tire pan 8 is deformed so that the vicinity of the top portions of the arc of the arc-shaped beads 12a to 12e are pleated, and the whole arc-shaped beads 12a to 12e gradually collapse; accordingly, the collision energy is efficiently absorbed during the deformation.

When rear-end collision load L is further applied, finally, as shown in FIG. 7, the spare tire pan 8 is bent at the middle portion so that the vicinity of the top of the substantially conical portion 11 is further pushed upward, and efficiently absorb the collision energy. The spare tire pan 8 is deformed as above-described; as a result, crush dust "a" of the spare tire pan 8 does not accumulate in the deformable portion of the spare tire pan 8. Accordingly, a large crushable margin of the spare tire pan 8 can be ensured. That is, as shown in FIG. 7 by chain lines, if the spare tire pan 8 is bent downward at the middle portion thereof, the crush dust "a" gets between the deformed portions. Accordingly, further deformation of the spare tire pan 8 will be prevented; therefore, deformation of the vehicle body owing to the collision load L advances forward of the rear cross member 5. However, in the present rear structure of the vehicle body, the spare tire pan 8 is securely bent upward at the middle portion thereof; therefore, the prevention of the spare tire pan 8 against the deformation owing to the crush dust "a" can be prevented.

In the conventional structure, in a case of a rear-end offset collision in which a collision portion is deviated to left or right of the vehicle width direction, collision load is input mainly to the rear frame 2 on the collision side. However, in the vehicle 1 having the rear structure of the vehicle body according to the present invention, the collision load is input to the rear frame 2 of the collided side and the top portion of the arc-shaped frame 20 at the middle of the vehicle width direction. The load input to the top portion of the arc-shaped frame 20 is transmitted through both ends of the arc to the middle portions of the left-and-right rear frames 2. Therefore, even when the rear-end offset collision, the left-and-right rear frames 2 can support the load evenly. As a result, the load input to the spare tire pan 8 can be applied surely to the vicinity of the top portions of the arc-shaped beads 12a to 12e.

In the vehicle 1 having the present rear structure of a vehicle, the first reinforcing portions 20a having substantially L-shapes in sections of the arc-shaped frame 20 and the second reinforcing portions 16 having substantially L-shapes in sections of the rear frames 2 are fixed to each other with interposing the side flanges 8a of the tire spare pan 8. Accordingly, the closed section structure is formed between the first reinforcing portions 20a of the arc-shaped frame 20 and the second reinforcing portions 16. Therefore, the collision load input to the rear frames 2 and the arc-shaped frame 20 can be transmitted to the spare tire pan 8 as a stress directed in a shearing direction. As a result, by the shearing stress applied to the spare tire pan, the left-and-right rear frames 2 can be prevented from offset collapse. Therefore, even when the rear-end offset collision, the arc-shaped beads 12a to 12e on the spare tire pan 8 can surely be collapsed mainly at the vicinity of the top portions. Therefore, the deformation of the vehicle 1 at the front of the rear cross member 5 can be efficiently prevented since the collision load can be absorbed by the deformation of the spare tire pan 8.

Further, in the present rear structure of a vehicle body, since the first reinforcing portions 20a of the arc-shaped frame 20 and the second reinforcing portions 16 of the rear frames 2 (the first frames 14) are fixed to each other and forms the closed section, rigidity can surely be improved at joining portions of two load transmission paths (that is, the first load transmission path by the rear frames 2 and the second load transmission path by the arc-shaped frame 20). Especially, the square section at the fixed portion of the arc-shaped frame 20 and the rear frames 2 is interposed the spare tire pan 8 connecting the opposed corners. Therefore, the collapse of the section can be efficiently prevented.

Meanwhile, the present invention is not limited to the above-mentioned embodiment, and may have various modifications without departing from the scope and spirit of the present invention.

What is claimed is:

1. A rear structure of a vehicle body comprising:
   a left-and-right pair of rear frames which extend along a longitudinal direction of a vehicle body;
   a spare tire pan which is supported between the rear frames;
   an arc-shaped frame which forms an arc-shape opening forward of the vehicle body as seen in a plan view;
   a rear panel which forms a rear wall of the vehicle body; and
   a pair of side sills which is provided on both sides of the vehicle body, wherein:
   the arc-shaped frame is fixed at a middle portion along an extending direction thereof to the rear panel, and has first reinforcing portions in which both ends along the extending direction, which extend along the longitudinal direction, and which have cross sections opening toward the corresponding rear frames;
   each of the rear frames is fixed at a rear end thereof to the rear panel, is fixed at a front end thereof to the corresponding side sill, and has a second reinforcing portion which extends along the longitudinal direction and which has a cross section opening toward the corresponding first reinforcing portion; and
   the first reinforcing portions and the corresponding second reinforcing portions are fixed to each other interposing side flanges of the spare tire pan therebetween.

2. The rear structure of a vehicle body according to claim 1, wherein each of the rear frames includes:
   a first frame which is fixed to the rear panel; and
   a second frame which is fixed to the front end of the first frame and the side sill, and which has a rigidity higher than a rigidity of the first frame.

3. The rear structure of a vehicle body according to claim 1, further comprising a plurality of arc-shaped beads protruding upward and forming concentric arc shapes.

4. The rear structure of a vehicle body according to claim 3, further comprising linear beads extending from both ends of the arc-shaped beads and protruding upward, wherein the arc-shaped beads and the linear beads form U-shape beads opening forward of the vehicle body.

* * * * *

UNITED STATES PATENT AND TRADEMARK OFFICE
CERTIFICATE OF CORRECTION

PATENT NO. : 7,540,559 B2  Page 1 of 1
APPLICATION NO. : 12/107429
DATED : June 2, 2009
INVENTOR(S) : Egawa et al.

It is certified that error appears in the above-identified patent and that said Letters Patent is hereby corrected as shown below:

On the Title Page, Section [56] References Cited, FOREIGN PATENT DOCUMENTS, insert --JP   2004-338419   12/2004--.

Signed and Sealed this

Tenth Day of November, 2009

David J. Kappos
*Director of the United States Patent and Trademark Office*